United States Patent Office

3,206,416
Patented Sept. 14, 1965

3,206,416
POLYURETHANE FOAMS PREPARED FROM HALOGENATED CASTOR OIL
Manfred Dahm, Leverkusen, Germany, assignor to Farbenfabriken Bayer Aktiengesellschaft, Leverkusen, Germany, a corporation of Germany
No Drawing. Filed June 6, 1961, Ser. No. 115,083
Claims priority, application Germany, June 10, 1960, F 31,408
6 Claims. (Cl. 260—2.5)

This invention relates generally to the preparation of polyurethane foams and more particularly to the preparation of polyurethane foams having improved flame-resistant characteristics.

It has been proposed before to prepare polyurethane foam by reacting a polyhydroxy compound such as a polyester, a poly(alkylene ether) glycol or the like with an organic polyisocyanate in a reaction mixture containing a gas. Such a process is disclosed in U.S. Re. Patent 24,514. Castor oil or modified castor oil such as transesterified, hydrogenated or epoxidized castor oils have been used as the polyhydroxy compound in a foamable reaction mixture.

A conventional polyurethane foam is somewhat flame resistant, but it has been necessary in the past to add a flame retarding material in order to produce a foam sufficiently flame resistant for use for some purposes. It is proposed for example, in U.S. Patent 2,577,281 to include an unsaturated alkyl ester of aryl phosphonic acid in a foamable mixture to impart fire-resistant characteristics to the resulting foam. Halogenated esters of phosphoric acid or phosphorous acid, ammonium chloride, antimony oxide and ammonium phosphates have also been included in the foamable reaction mixture as fire retardants. Additives of this type do not become chemically combined with the polyurethane polymer so they are gradually lost in storage from the foam by volatilization. There has also been noted that foams containing such materials often deteriorate in storage because such materials act as a plasticizer. Such deterioration deleteriously affects the physical characteristics of the foam. Fire-proof polyurethanes have been prepared by using a polyester containing chlorine. The polyester is prepared by use of a chloro-substituted acid as one of the components in the esterification. Such a process has the disadvantage of requiring the use of an expensive polyester which usually has a higher melting point and, therefore, is of higher viscosity. The new castor oil products have a viscosity of only 800–2000 cp./25° C. which allows for better handling the materials when mixing together the foam forming reaction components. Furthermore, the new castor oil products are more compatible with the other foam forming ingredients as compared with the polyesters containing chloro substituted acids.

It is, therefore, an object of this invention to provide a method for producing a flame-resistant polyurethane foam devoid of the foregoing disadvantages. Another object of the invention is to provide a process for making a polyurethane foam which will remain flame resistant even during long storage periods. Still another object of the invention is to provide an improved flame-resistant polyurethane foam. It is a still further object of the invention to provide a method for making a flame-resistant polyurethane foam from castor oil.

The foregoing objects and others are accomplished in accordance with this invention, generally speaking, by providing a method for making a polyurethane foam wherein a halogenated castor oil is reacted with an organic polyisocyanate under conditions in which a gas becomes entrapped in the resulting reaction product as the reaction mixture increases in viscosity and solidifies. It has been found that a polyurethane foam prepared by reacting an organic polyisocyanate with a resinous component which includes a halogenated castor oil is flame resistant and remains flame resistant during storage.

Preferably, the halogenated castor oil is either a chlorinated or brominated castor oil. The halogenated castor oil can be prepared by any suitable method, but it is preferred to prepare it by introducing the halogen dropwise into castor oil at a temperature of from about 50° C. to about 150° C. Best results are obtained if the temperature of the castor oil, during the addition of the halogen, is within the range of from about 80° C. to about 130° C., so this temperature range is preferred. After reaction between the halogen and castor oil has been completed, the product is cooled and any traces of hydrogen halides in the product are removed. The hydrogen halides can be removed from the product by applying a vacuum thereto for from about 30 minutes to about 1 hour.

The quantity of halogen added to the castor oil can vary over wide limits. It is not necessary to add sufficient chlorine or bromine or other halogen to react with all of the unsaturation in the castor oil. The amount of halogen added will vary with the characteristics desired and the extent of flame resistance desired in the finished product so all suitable amounts are contemplated. The density of the product will also control the amount of halogen added. For best results, however, it is preferred that the halogen content of the polyester be from about 5 to about 30 percent by weight of the reaction product.

In its broadest aspects, the invention contemplates the preparation of a polyurethane foam from a halogenated castor oil as the only organic compound having hydrogen atoms reactive with a polyisocyanate. However, a process where a halogenated castor oil and a polyhydric poly(alkylene ether) are both reacted with an organic polyisocyanate in the preparation of a foam is preferred. Any suitable polyhydric poly(alkylene ether) can be used, but it is preferred that the polyhydric poly(alkylene ether) have 2 to 6 hydroxyl groups per mol and contain from about 1% to about 30% by weight hydroxyl groups. The molecular weight should be at least about 200 and preferably from about 300 to about 5,000. A polyhydric poly(alkylene ether) having an hydroxyl content of from about 1% to about 3% by weight and a molecular weight of from about 2,000 to about 5,000 is preferred for the preparation of soft polyurethane foams while a polyhydric poly(alkylene ether) containing from about 20% to about 25% hydroxyl groups by weight and having a molecular weight from about 200 to about 1,000 is prepared for making hard foams. The poly(alkylene ether) can be prepared by any known process such as by condensation of an alkylene oxide having from 1 to 5 carbon atoms. Examples of suitable alkylene oxides include ethylene oxide, propylene oxide, butylene oxide, amylene oxide or the like; tetrahydrofuran can be polymerized to form a poly(tetramethylene ether) glycol. A suitable polyhydric poly(alkylene ether) can be prepared by condensing one of the said alkylene oxides with a suitable polyhydric alcohol such as, ethylene glycol, diethylene glycol, glycerine, trimethylolpropane, pentaerythritol, hexanediol or the like.

It is particularly desirable to use a condensation product of an alkylene oxide such as, for example, ethylene oxide, propylene oxide or the like and an aliphatic polyamine for making hard foams as the polyether having a molecular weight of at least about 200. Any suitable aliphatic polyamine can be used in this condensation such as, for example, ethylene diamine, diethylene triamine, propylene diamine, butylene diamine, cyclohexylene diamine, or the like.

The flame-resistant properties of the foam can be further improved by including a reaction product of phosphoric acid or phosphorous acid with an alkylene oxide or alkylene glycol in the reaction mixture containing the halogenated castor oil. Compounds of the following formula, for example, can be used:

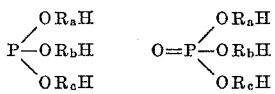

or

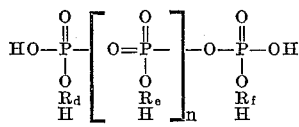

in which $a$, $b$, $c$, $d$, $e$ and $f$ represent numbers from 1 to 35, $n$ is equal to 0 to 20 and R represents an alkoxy group such as, for example, methoxy, ethoxy, propoxy or the like, it being possible for the individual groups R to be the same or different. The combination of the halogenated castor oil with one of these additives produces a synergistic effect.

Any amount of poly(alkylene ether) can be included in the reaction mixture with a halogenated castor oil, but it is preferred to use from about 3% by weight to about 50% by weight polyhydric poly(alkylene ether) based on the weight of halogenated castor oil.

Any suitable organic polyisocyanate can be used such as, for example, ethylene diisocyanate, propylene diisocyanate, tetramethylene diisocyanate, pentamethylene diisocyanate, hexamethylene diisocyanate, octamethylene diisocyanate, undecamethylene diisocyanate, dodecamethylene diisocyanate, 3,3'-diisocyanato dipropylether, cyclopentylene - 1,3 - diisocyanate, cyclohexylene-1,4-diisocyanate, 2,4-toluylene diisocyanate, 2,6-toluylene diisocyanate and mixtures of 2,4- and 2,6-toluylene diisocyanate including 80 percent 2,4- and 20 percent 2,6-toluylene diisocyanate, xylene-1,4-diisocyanate, xylylene-1,3-diisocyanate, 4,4' - diphenylmethane diisocyanate, 2 - nitrodiphenyl-4,4'-diisocyanate, 4,4'-diphenylpropane diisocyanate, p-isocyanato benzyl isocyanate, m-phenylene diisocyanate, p- phenylene diisocyanate, naphthylene-1,4-diisocyanate, naphthylene-1,5-diisocyanate, furfurylidene diisocyanate, p,p',p''-triphenylmethane triisocyanate, diphenyl-4,6,4'-triisocyanate, 1-ethoxy - 2,4 - benzene diisocyanate, or the like.

Polyurethane foam can be made in accordance with this invention by any suitable technique or set of manipulative steps. The apparatus and process for mixing liquids together, disclosed in U.S. Re. Patent 24,514 can be used to prepare the foam in accordance with this invention. Water can be included in the reaction mixture to react with the polyisocyanate to form carbon dioxide which becomes entrapped in the reaction mixture to form a porous product. Any suitable amount of water such as, for example, from about 0.5 to about 5 parts water per 100 parts resinous component, i.e., halogenated castor oil or halogenated castor oil plus polyhydric poly(alkylene ether) can be used. It is not necessary to use water in all formulations as a halogenoalkane or other gas can be included to affect the blowing of the foam. Dichlorodifluoroethane, air, oxygen, nitrogen or the like can be used with water or alone to form the porous structure. Any suitable activator such as, for example, stannous octoate, stannous oleate, triethylene diamine, dibutyl-tin-dilaurate, N-methyl-N'-dimethyl aminoethyl piperazine or the like can be used. Emulsifiers and catalysts disclosed in U.S. Re. Patent 24,514, for example, can be used. In fact, any of the known reagents ordinarily used can be included in the foamable mixture. Dimethyl siloxane or a siloxane oxyalkylene block copolymer can be used as a stabilizer.

The invention contemplates either a prepolymer process or a one-shot process for making polyurethane foams. In the prepolymer process the halogenated castor oil with or without polyhydric poly(alkylene ether) is heated under substantially anhydrous conditions with an organic polyisocyanate to form an —NCO terminated adduct. This adduct is then reacted with water in a second step to produce a foam. In a one-shot process, the organic polyisocyanate, halogenated castor oil and other ingredients of the foamable mixture are all mixed together substantially simultaneously.

Halogenated castor oils are particularly advantageous for the preparation of flame-resistant polyurethane foams because of their relatively low viscosity which permits easy mixing of the components and results in the preparation of a product of greater uniformity. Blow holes and cracks are avoided in the product. Moreover, the products obtained show little tendency towards brittleness. An increase in the halogen content results in improvement in flame resistance without deleteriously affecting the physical properties of the foam. The hot bending strength and low water absorption of a foam produced from castor oil is not seriously affected even when the halogen content of the castor oil approaches the maximum amount which can be added through the unsaturation.

Polyurethane foams produced in accordance with this invention can be used to advantage for making upholstered articles such as, for example, cushions or for padding chairs, sofas and the like.

The invention is further illustrated by the following examples in which parts are by weight unless otherwise specified.

Example 1

Production of the starting material:

About 7.0 kg. of castor oil are heated to about 105° C. and while stirring, about 2.6 kg. of bromine are slowly run in, the temperature rising to about 110° C. After cooling, traces of hydrogen bromide are removed in vacuo at room temperature. A reddish-brown oil with an hydroxyl number of 97.0, an acid number of 41.0, a water content of about 0.35% and a viscosity of about 2240 cp./25° C. is formed. About 100 parts by weight of a mixture of about 80 parts by weight of the brominated castor oil obtained as starting material and about 20 parts by weight of propoxylated ethylene diamine (21% OH) are mixed with about 0.1 part by weight of endoethylene piperazine, about 0.1 part by weight of dibutyl-tin-dilaurate, about 2.5 parts by weight of water and about 119 parts by weight of diphenylmethane-4,4'-diisocyanate. The foam material forming from the liquid reaction mixture has a hot-bending strength of about 142° C., a weight per unit volume of about 40 kg./m.$^3$, a compressive strength of about 0.8 kg./cm.$^2$ and a water absorption, after being kept for about 24 hours under water, of about 1.6%. In particular, it has very good flame-resisting properties.

Example 2

About 100 parts by weight of a mixture of about 45 parts by weight of the brominated castor oil described under Example 1, about 45 parts by weight of a polyether (13% OH, acid number 2.13) obtained by alkoxylation of phosphoric acid, and about 10 parts by weight of propoxylated ethylene diamine (21% OH) are mixed with about 3.0 parts by weight of N-methyl-N'-dimethylaminoethyl piperazine, about 0.3 part by weight of a water-soluble polysiloxane-polyalkylene oxide copolymer, about 6.0 parts by weight of sodium-castor oil sulphate (water content about 50%) and about 142 parts by weight of diphenylmethane - 4,4' - diisocyanate. The flame-resisting foam material forming from the liquid reaction mixture has a hot-bending strength of about 136° C., a weight per unit volume of about 31 kg./m.³, a compressive strength of about 1.2 kg./cm.² and an impact toughness of about 0.4 cm. kg./cm.². The water absorption is about 2.0% after being kept under water for about 24 hours.

*Example 3*

About 100 parts by weight of a mixture of about 75 parts by weight of the brominated castor oil described in Example 1, about 15 parts by weight of propoxylated ethylene diamine (21% OH) and about 10 parts by weight of a branched polypropylene glycol (11.5% OH) are mixed with about 0.2 part by weight of endoethylene piperazine, about 0.1 part by weight of dibutyl-tin-dilaurate, about 1.5 parts by weight of sodium-castor oil sulphate (water content 50%), about 1.75 parts by weight of water and about 113 parts by weight of diphenylmethane-4,4'-diisocyanate. The flame-resistant foam material forming from the liquid reaction mixture has a hot-bending strength of about 137° C., a weight per unit volume of about 37 kg./m³, a compressive strength of about 0.9 kg./cm.² and an impact toughness of about 0.4 cm. kg./cm.². The water absorption is about 2.0% after being kept under water for about 24 hours.

*Example 4*

About 100 parts by weight of the castor oil described in Example 1 are mixed with about 3.0 parts by weight of N-methyl-N'-dimethylaminoethyl piperazine, about 0.3 part by weight of dibutyl-tin-dilaurate, about 0.3 part by weight of a water-soluble polysiloxane-polyalkylene oxide copolymer, about 2.0 parts by weight of water and about 80 parts by weight of diphenyl-methane-4,4'-diisocyanate. The flame-resisting foam material forming from the liquid reaction mixture has a hot-bending strength of about 80° C., a weight per unit volume of about 52 kg./m.³, a compressive strength of about 0.8 kg./cm.² and an impact toughness of about 0.6 cm. kg./cm.². The water absorption is about 2% after being kept under water for about 24 hours.

*Example 5*

About 100 parts by weight of a mixture of about 50 parts by weight of the brominated castor oil described in Example 1 and about 50 parts by weight of a branched polypropylene glycol (11.5% OH) are mixed with about 2.0 parts by weight of N-methyl-N'-dimethylaminoethyl piperazine, about 0.3 part by weight of dibutyl-tin-dilaurate, about 0.3 part by weight of a water-soluble polysiloxane-polyalkylene oxide copolymer, about 5 parts by weight of sodium-castor oil sulphate (water content 50%) and about 126 parts by weight of diphenylmethane-4,4'-diisocyanate. The foam material forming from the liquid reaction mixture has good flame-resisting properties and has the following physical values: hot-bending strength about 110° C., weight per unit volume about 36 kg./m.³, compressive strength about 1.8 kg./cm.², impact toughness about 0.7 cm. kg./cm.².

*Example 6*

Production of the starting material:

About 487 grams of castor oil are heated to about 130° C. and chlorine is introduced in a slow stream over a period of about 2 hours while stirring. After cooling, traces of hydrogen chloride are removed at room temperature by introducing nitrogen. The forming reddish-brown oil has taken up about 20 grams (about 4.1% by weight) of chlorine and has an hydroxyl number of 129.0, an acid number of 33.4, a water content of about 0.47% and a viscosity of about 1200 cp./25° C.

About 100 parts by weight of a mixture of about 80 parts by weight of the chlorinated castor oil obtained as starting material and about 20 parts by weight of propoxylated ethylene diamine (21% OH) are mixed with about 0.3 part by weight of endoethylene piperazine, about 0.1 part by weight of dibutyl-tin-dilaurate, about 0.2 part by weight of a water-soluble polysiloxane-polyalkylene oxide copolymer, about 1.0 part by weight of water and about 96 parts by weight of diphenylmethane-4,4'-diisocyanate. The foam material forming from the liquid reaction mixture has a weight per unit volume of about 112 kg./m.³ and has good flame-resistant properties.

*Example 7*

From about 300 parts by weight of the brominated castor oil described in Example 1 and about 200 parts by weight of toluylene diisocyanate, and after adding about 0.5 cc. of benzoyl chloride, an initial adduct is prepared by heating for about 1 hour to about 80° C. This adduct has a viscosity of about 70,000 cp./25° C. and an —NCO content of about 12.0%.

About 100 parts by weight of this initial adduct are mixed with about 2.6 parts by weight of water and about 1.6 parts by weight of N-methyl-N'-dimethylaminoethyl piperazine. The foam material forming from the liquid reaction mixture has a weight per unit volume of about 32 kg./m.³ and has good flame-resisting properties.

It is to be understood that any other polyhydric poly(alkylene ether), any other organic polyisocyanate, catalyst or other component of the reaction mixture indicated as suitable herein can be substituted for the particular ones in the foregoing examples.

Although the invention has been described in considerable detail for the purpose of illustration, it is to be understood that variations can be made therein by those skilled in the art without departing from the spirit of the invention and the scope of the claims.

What is claimed is:

1. A polyurethane foam prepared by a process which comprises reacting an organic polyisocyanate with a halogenated castor oil having a viscosity of from about 800 to about 2000 cp./25° C. in a reaction mixture containing a blowing agent.

2. A polyurethane foam prepared by a process which comprises reacting an organic polyisocyanate with a halogenated castor oil and a polyhydric poly(alkylene ether) having a molecular weight of at least about 200 and an hydroxyl content of from about 1 to about 30 percent in a reaction mixture containing a blowing agent.

3. A polyurethane foam prepared by a process which comprises reacting an organic polyisocyanate with a halogenated castor oil and not more than about 50 percent based on the weight of the halogenated castor oil of a polyhydric poly(alkylene ether) having a molecular weight of at least about 200 and an hydroxyl content of about 1 to about 30 percent in a reaction mixture containing a blowing agent.

4. The polyurethane foam of claim 2 wherein the polyhydric poly(alkylene ether) is the reaction product of an alkylene oxide and an aliphatic diamine.

5. The polyurethane foam of claim 2 wherein the reaction mixture contains a compound having a generic formula selected from the group consisting of

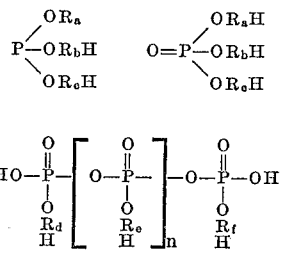

and wherein $a$, $b$, $c$, $d$, $e$, and $f$ are numbers from 1 to 35, $n$ is equal to a number from 0 to 20 and R is an alkoxy group.

6. A polyurethane foam prepared by a process which comprises reacting a halogenated castor oil and from about 3 percent to about 50 percent by weight of a polyhydric poly(alkylene ether) based on the weight of the halogenated castor oil with an organic polyisocyanate in a reaction mixture containing a blowing agent.

References Cited by the Examiner

UNITED STATES PATENTS

| | | | |
|---|---|---|---|
| 2,557,159 | 6/51 | Teeter et al. | 260—408 |
| 2,787,601 | 4/57 | Detrick et al. | 260—2.5 |
| 2,953,533 | 9/60 | Khawam | 260—2.5 |
| 2,955,091 | 10/60 | Kane | 260—2.5 |

LEON J. BERCOVITZ, *Primary Examiner.*

UNITED STATES PATENT OFFICE
CERTIFICATE OF CORRECTION

Patent No. 3,206,416                    September 14, 1965

Manfred Dahm

It is hereby certified that error appears in the above numbered patent requiring correction and that the said Letters Patent should read as corrected below.

Column 3, lines 15 to 19, the formula should appear as shown below instead of as in the patent:

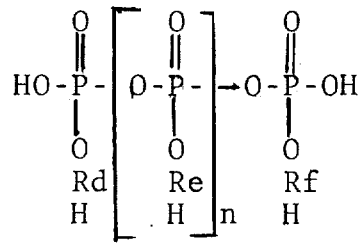

column 6, lines 66 to 69, the left-hand formula should appear as shown below instead of as in the patent:

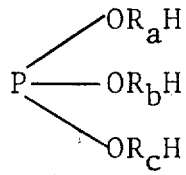

Signed and sealed this 24th day of January 1967.

(SEAL)
Attest:

ERNEST W. SWIDER                    EDWARD J. BRENNER
Attesting Officer                Commissioner of Patents